(12) United States Patent
Jun et al.

(10) Patent No.: US 9,274,347 B2
(45) Date of Patent: Mar. 1, 2016

(54) POLARIZED GLASSES TYPE STEREOSCOPIC IMAGE DISPLAY DEVICE AND METHOD OF FABRICATING THE SAME

(71) Applicant: LG Display Co., Ltd., Seoul (KR)

(72) Inventors: WooYeal Jun, Gyeongsangbuk-do (KR); SungKon Ko, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 14/107,198

(22) Filed: Dec. 16, 2013

(65) Prior Publication Data

US 2014/0293171 A1 Oct. 2, 2014

(30) Foreign Application Priority Data

Mar. 26, 2013 (KR) .......................... 10-2013-0032239

(51) Int. Cl.
*G02F 1/1335* (2006.01)
*G02F 1/1343* (2006.01)
*G02B 27/26* (2006.01)

(52) U.S. Cl.
CPC ...................................... *G02B 27/26* (2013.01)

(58) Field of Classification Search
CPC ............................... G02F 1/1333; G02B 27/26
USPC ............................................ 349/15, 106, 110
See application file for complete search history.

(56) References Cited

U.S. PATENT DOCUMENTS

| 5,870,157 A * | 2/1999 | Shimada et al. ............... 349/106 |
| 2006/0146254 A1* | 7/2006 | Kim .............................. 349/141 |
| 2012/0002123 A1* | 1/2012 | Kang .............................. 349/15 |
| 2012/0274628 A1 | 11/2012 | Lim et al. |

FOREIGN PATENT DOCUMENTS

| CN | 100422831 C | 7/2006 |
| CN | 102313998 A | 1/2012 |
| CN | 102750899 A | 10/2012 |
| TW | 200951594 A | 12/2009 |
| TW | 201215920 A | 4/2012 |
| TW | 201224595 A | 6/2012 |
| TW | 201241522 A | 10/2012 |

OTHER PUBLICATIONS

State Intellectual Property Office of the People's Republic of China, First Office Action, Chinese Patent Application No. 201310728250. 2, Dec. 25, 2015, seventeen pages.

* cited by examiner

*Primary Examiner* — Nathaniel R Briggs
(74) *Attorney, Agent, or Firm* — Fenwick & West LLP

(57) ABSTRACT

A polarized glasses type stereoscopic image display device and a fabricating method thereof according to the present disclosure is characterized in that in a polarized glasses type stereoscopic image display device in which an image panel is implemented as a color filter on TFT (COT) type liquid crystal display (LCD) device, an internal reflection due to light shielding patterns with high reflectivity can be reduced by opening light shielding patterns formed on a black stripe region to the full and simultaneously forming a light shielding layer in such a manner of additionally depositing color pigments on the open light shielding patterns.

13 Claims, 12 Drawing Sheets

POLARIZED GLASSES TYPE STEREOSCOPIC IMAGE DISPLAY DEVICE AND METHOD OF FABRICATING THE SAME

CROSS-REFERENCE TO RELATED APPLICATION

Pursuant to 35 U.S.C. §119(a), this application claims the benefit of earlier filing date and right of priority to Korean Application No. 10-2013-0032239, filed on Mar. 26, 2013, the contents of which is incorporated by reference herein in its entirety.

BACKGROUND OF THE DISCLOSURE

1. Field of the Disclosure

This specification relates to a polarized glasses type stereoscopic image display device and a method of fabricating the same, and particularly, to a polarized glasses type image display device, capable of viewing a stereoscopic image using polarized glasses, and a method of fabricating the same.

2. Background of the Disclosure

Briefly, a three-dimensional (3D) display may be referred to as "a system of artificially reproducing a 3D screen."

Here, the system includes both a software technology by which images are displayed in a 3D form and hardware which actually realizes contents created by the software technology into the 3D form. The reason for including the software technology is that 3D display hardware require that content be generated using different software technology for each method of creating stereoscopic images (stereoscopic image creating method).

Also, a virtual 3D display is a general type of system, which provides a virtual stereoscopic feeling from flat display hardware using a binocular disparity, which is caused as eyes are apart from each other by about 65 mm in a horizontal direction, as one of factors that a user feels a sense of three-dimension. In other words, two eyes see slightly different images (namely, slightly sharing left and right special information with each other) due to the binocular disparity, even if the eyes view the same thing. When the two images are transferred to the brain through the retina, the brain may accurately unify the two images such that the user can feel the sense of three-dimension. This mechanism is employed in a 2D display device in such a manner of simultaneously displaying two left and right images and delivering the two images to the respective eyes so as to create a virtual stereoscopic feeling, which is the virtual 3D display.

In order to show images of two channels on one screen in the virtual 3D display hardware device, for example, channels are output one by one on one screen in such a manner of switching lines one by one in a right or left direction. For an auto-stereoscopic display device, in view of a hardware configuration, when the images of two channels are simultaneously output on one display device, a right image may be delivered directly to a right eye and a left image may be delivered only to a left eye. Also, for a glasses-wearing type display device, a right image is hidden from a left eye and a left image is hidden from a right eye by use of specific glasses suitable for each stereoscopic image creating method.

The glasses-wearing methods may include an anaglyph type of wearing blue and red glasses on left and right eyes, respectively, a polarized glasses type of wearing polarized glasses with different right and left polarization directions, and a liquid crystal shutter type using glasses with a liquid crystal shutter, which synchronizes with a period of repeating a time-divided screen. Among others, the polarized glasses type has an advantage of easily realizing 3D images from two images configured in a 2D form.

FIG. 1 is an exemplary view illustrating a schematic structure of a general polarized glasses type stereoscopic image display device.

Referring to FIG. 1, a polarized glasses type is a type of spatially isolating left and right images from each other by arranging a patterned retarder 2 on a front surface of an image panel 1.

The pattern retarder 2 of the polarized glasses type stereoscopic image display device refers to a film which has a predetermined pattern on the position basis, such that polarized states of left and right images can be perpendicular to each other.

For example, the patterned retarder 2 may include a glass substrate. Although not shown in detail, an alignment layer and a double refraction layer may be sequentially formed on the substrate. The alignment layer and the double refraction layer may have regular patterns of first and second regions 2a and 2b. The first region 2a and the second region 2b may be formed by stripes which are arranged in an alternating manner to correspond to image lines of the image panel 1. The regions 2a and 2b may have the same alignment direction.

Here, when the image panel 1 is implemented as a liquid crystal display device, a polarizer 11 having an optical absorption shaft in a horizontal direction may be disposed, for example, between the image panel 1 and the patterned retarder 2.

FIG. 2 is a planar view schematically illustrating a partial structure of a general liquid crystal display (LCD) device, which merely illustrates a part of upper and lower glass substrates for the sake of brief explanation.

Here, the LCD device actually has N×M pixels defined by intersection between N gate lines and M data lines. However, for brief description, one pixel composed of red, green and blue (R, B, B) sub-pixels is exemplarily illustrated.

For reference, a reference numeral Ps denotes one sub-pixel region.

FIG. 3 schematically illustrates a cross-section taken along the line A-A' of FIG. 2.

Referring to FIGS. 2 and 3, the LCD device may include two sheets of glass substrates 5 and 10, and a liquid crystal layer (not shown) interposed therebetween with a cell gap maintained by a column spacer 40.

On the lower glass substrate 10 may be formed gate lines 16 and data lines 17 which are arranged horizontally and longitudinally to define sub-pixel regions Ps. A thin film transistor (TFT) as a switching device may be formed on each intersection between the gate lines 16 and the data lines 17.

Although not shown, a plurality of pixel electrodes and common electrodes for forming a horizontal electric field may be formed within the sub-pixel region Ps in an alternating manner. A common line 81 may be arranged in substantially the same direction as the gate line 16 below the sub-pixel region Ps.

The TFT may include a gate electrode connected to the gate line 16, a source electrode connected to the data line 17, and a drain electrode connected to the pixel electrode. TFT may also include a plurality of insulating layers 15a, 15b and 15c for insulation between components, and an active pattern forming a conductive channel between the source electrode and the drain electrode by a gate voltage supplied to the gate electrode.

The upper glass substrate 5 may be provided with a color filter array. The color filter array may include a black matrix 6, color filters 7 (7a, 7b and 7c), and an overcoated layer 9.

In the general polarized glasses type stereoscopic image display device, a currently widely employed method is to arrange left and right images on the line basis. That is, as illustrated, a left image (L) may be arranged on an odd line and a right image (R) on an even line in a perpendicular direction. When the L and R images are displayed on the image panel 1, a viewer may wear watching glasses 3 to watch the L and R images in an isolating manner, thereby enjoying a 3D image.

However, the polarized glasses type may be unable to accurately isolate the L and R images from each other by use of the polarizer because the L and R images come in contact with each other. This may cause a crosstalk that the R image leaks into the left eye and the L image leaks into a right eye, or a limited up/down viewing angle.

SUMMARY OF THE DISCLOSURE

Therefore, to obviate the drawbacks of the related art, an aspect of the detailed description is to provide a polarized glasses type stereoscopic image display device, capable of preventing a crosstalk between a right-eye image and a left-eye image, and a method of fabricating the same.

Another aspect of the detailed description is to provide a polarized glasses type stereoscopic image display device, having improved up/down viewing angle and aperture ratio by applying a color filter on thin film transistor (TFT) (COT) type LCD device to an image panel, and a method of fabricating the same.

Another aspect of the detailed description is to provide a polarized glasses type stereoscopic image display device, capable of reducing an internal reflection due to light shielding patterns, in the polarized glasses type stereoscopic image display device having the COT type LCD device as the image channel, and a method of fabricating the same.

Other aspects and features of the present disclosure will be apparent by the configuration and claims disclosed herein.

To achieve these and other advantages and in accordance with the purpose of this specification, as embodied and broadly described herein, there is provided a polarized glasses type stereoscopic image display device, representing a stereoscopic image by disposing a patterned retarder on a front surface of a liquid crystal display device, the polarized glasses type stereoscopic image display device including gate lines and data lines formed on a first substrate and intersecting with the each other to define red, green and blue sub-pixel regions, a thin film transistor formed on each intersection between the gate lines and the data lines, red, green and blue color filters formed within the red, green and blue sub-pixel regions of the first substrate, respectively, a light shielding layer formed on an up/down boundary between the sub-pixel regions (i.e., black stripe region) in such a manner of depositing color pigments of the red, green and blue color filters, common electrodes and pixel electrodes formed within the sub-pixel regions of the first substrate having the red, green and blue color filters and the light shielding layer, first light shielding patterns formed on at least one of upper and lower sides of the black stripe region to be in parallel to the gate line, and a second substrate bonded to the first substrate in a facing manner.

Here, the first light shielding patterns may be formed of the same opaque conductive material on the same layer as the common electrodes and the pixel electrodes.

The device may further include a common line formed adjacent to an upper side or a lower side of the gate line.

Here, the common line may be formed on the same layer as the gate line to be in parallel to the gate line.

The first light shielding patterns may be formed on upper and lower sides of the black stripe region to be in parallel to the gate line and the common line.

The light shielding layer may be formed in such a manner of depositing a red color pigment of the red color filter and a blue color pigment of the blue color filter.

The device may further include a second light shielding pattern formed on a left/right boundary between the sub-pixel regions to cover the data line.

To achieve these and other advantages and in accordance with the purpose of this specification, as embodied and broadly described herein, there is provided a method for fabricating a polarized glasses type stereoscopic image display device, representing a stereoscopic image by disposing a patterned retarder on a front surface of a liquid crystal display device, the method including forming gate lines and data lines intersecting with each other on a first substrate to define red, green and blue sub-pixel regions, forming a thin film transistor on each intersection between the gate lines and the data lines, forming red, green and blue color filters within red, green and blue sub-pixel regions of the first substrate, forming a light shielding layer on an up/down boundary between the sub-pixel regions (i.e., a black stripe region) by way of depositing color pigments of the red, green and blue color filters, forming common electrodes and pixel electrodes within the sub-pixel regions of the first substrate having the red, green and blue color filters and the light shielding layer, forming first light shielding patterns on at least one of upper and lower sides of the black stripe region to be in parallel to the gate line, and bonding the first substrate to a second substrate.

Here, the first light shielding patterns may be formed of the same opaque conductive material on the same layer as the common electrodes and the pixel electrodes.

The method may further include a common line adjacent to an upper side or a lower side of the gate line.

Here, the common line may be formed on the same layer as the gate line to be in parallel to the gate line.

The first light shielding patterns may be formed on upper and lower sides of the black stripe region to be in parallel to the gate line and the common line.

The light shielding layer may be formed in such a manner of depositing a red color pigment of the red color filter and a blue color pigment of the blue color filter.

The method may further include forming a second light shielding pattern on a left/right boundary between the sub-pixel regions to cover the data line.

As described above, in a polarized glasses type stereoscopic image display device and a fabricating method thereof according to the present disclosure, an image panel may be implemented as a COT type LCD device so as to improve an up/down viewing angle and an aperture ratio of the polarized glasses type stereoscopic image display device.

Also, in the polarized glasses type stereoscopic image display device and the fabricating method thereof according to the present disclosure, an internal reflection due to light shielding patterns with high reflectivity can be reduced by opening light shielding patterns formed on a black stripe region to the full and simultaneously forming a light shielding layer in such a manner of additionally depositing color pigments on the open light shielding patterns. This may allow a metallic material with low resistivity to be used for a common electrode and a pixel electrode, which may result in improvement of process efficiency and product quality.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, a polarized glasses type stereoscopic image display device and a fabricating method thereof according to an exemplary embodiment of the present disclosure will be described with reference to the accompanying drawings, such that those skilled in the art to which the present disclosure belongs can easily practice it.

Advantages and features of the present disclosure and methods for achieving those will be obviously understood by the following exemplary embodiments described in detail with reference to the accompanying drawings. However, the present disclosure is not to be construed as being limited to the exemplary embodiments but can be implemented into various forms. The exemplary embodiments of the present disclosure are merely illustrated to fully describe the present disclosure and provided to help a skilled person in the art to understand the scope of the present disclosure. The present disclosure is merely defined by the claims. The same/like reference symbols or numerals over the specification refer to the same/like components.

A polarized glasses type according to the present disclosure uses a polarization phenomenon, namely, arranges a patterned retarder on a front surface of an image panel to spatially isolate left and right images from each other.

The patterned retarder of the polarized glasses type stereoscopic image display device refers to a film having a predetermined pattern on the position basis, such that polarized states of left and right images can be perpendicular to each other.

The image panel may be implemented as one of a liquid crystal display (LCD), a field emission display (FED), a plasma display panel (PDP), and an electroluminescent display (EL).

Here, when the image panel is implemented as the LCD, for example, an upper polarizer having an optical absorption shaft in a horizontal direction may be disposed between the image panel and the patterned retarder. Also, a backlight unit may be disposed below the image panel and a lower polarizer may be disposed between the image panel and the backlight unit.

Figure 1:
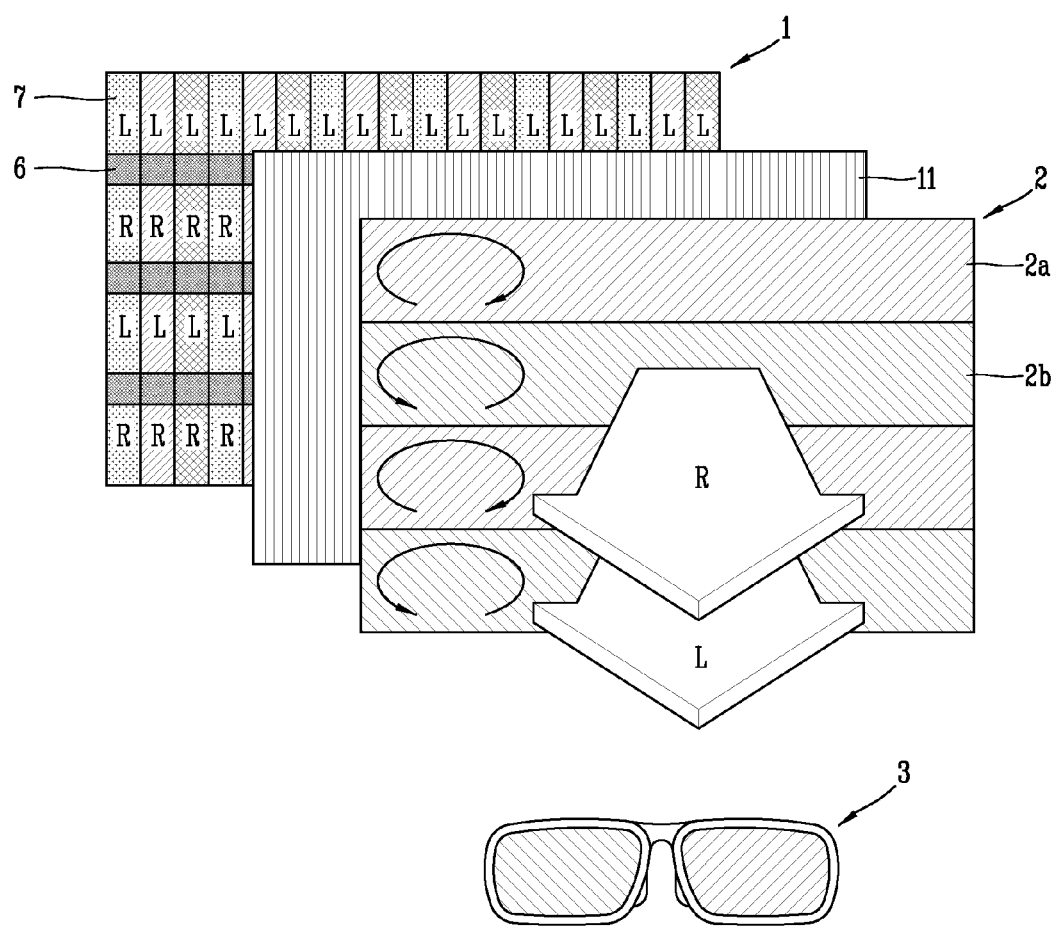
FIG. 1 is an exemplary view illustrating a schematic structure of a general polarized glasses type stereoscopic image display device.
Figure 2:
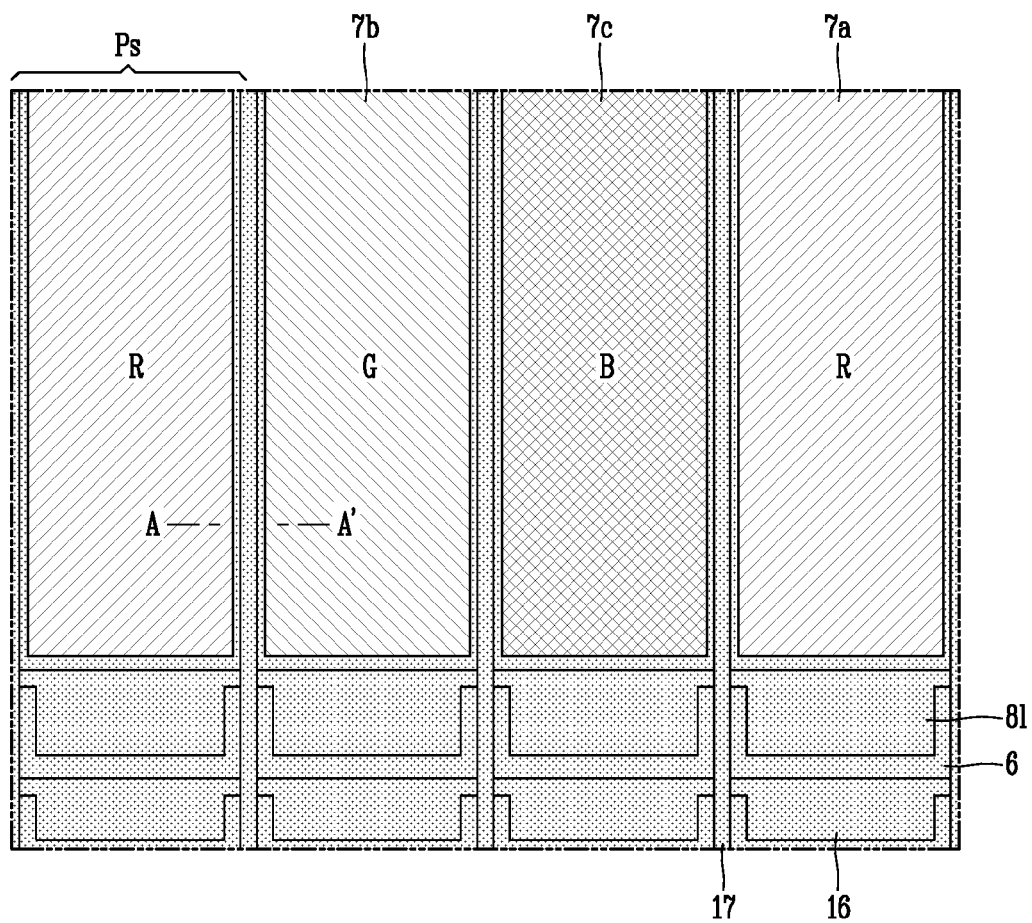
FIG. 2 is a planar view schematically illustrating a part of the general LCD device.
Figure 3:
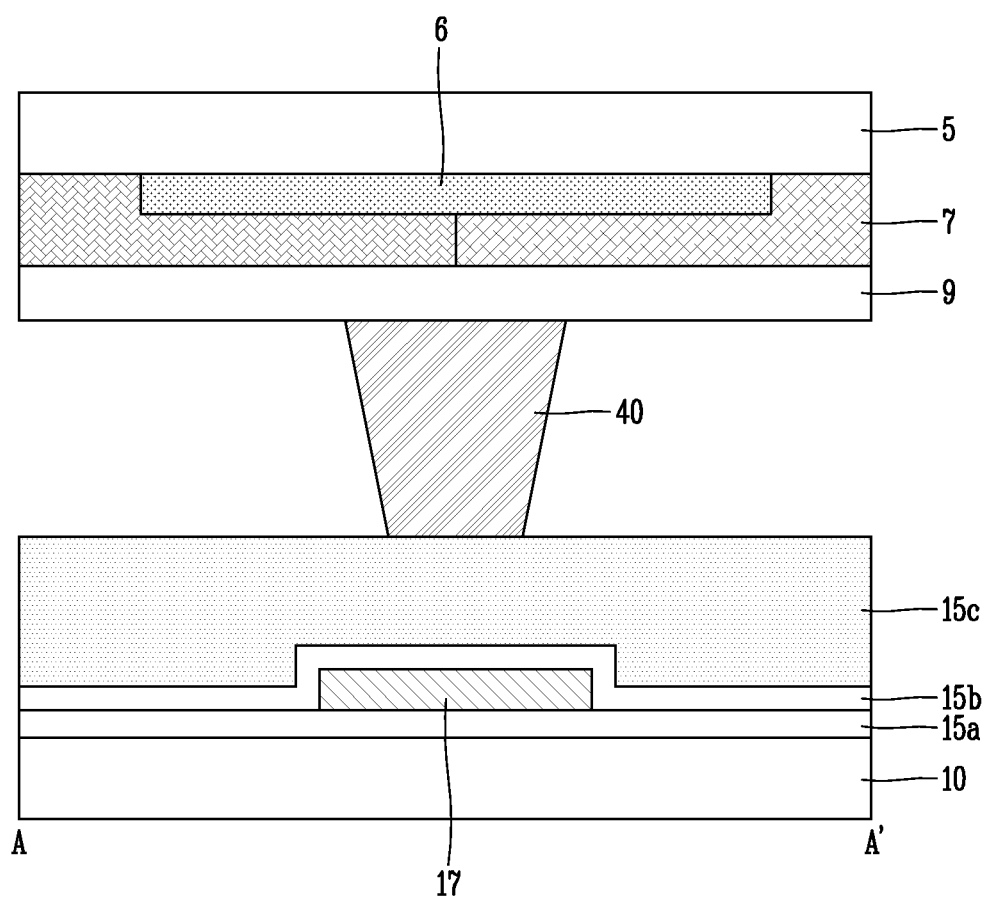
FIG. 3 is a schematic sectional view taken along the line A-A' of FIG. 2.
Figure 4:
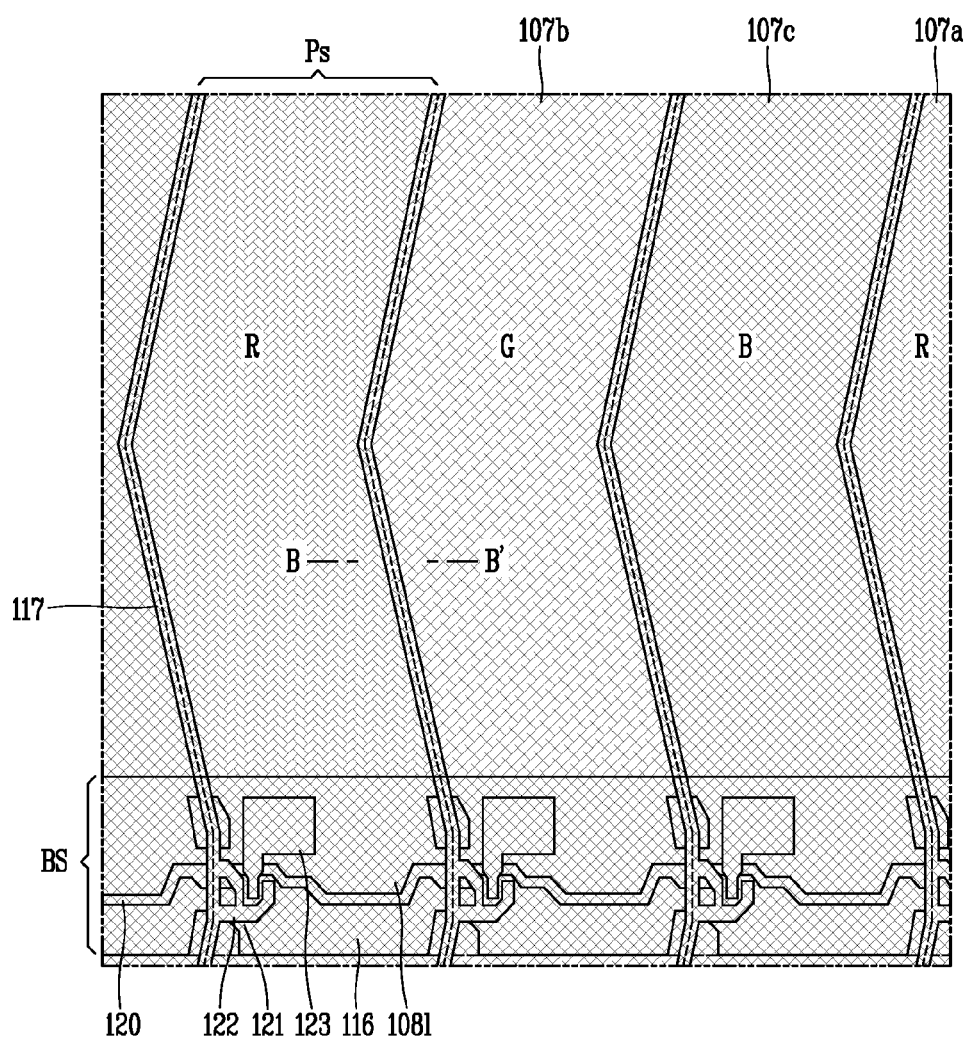
FIG. 4 is a planar view schematically illustrating a partial structure of an LCD device in accordance with an exemplary embodiment.

FIG. 4 is a planar view schematically illustrating a partial structure of an LCD device in accordance with an exemplary embodiment, which exemplarily illustrates a part of an In-plane switching (IPS) mode LCD device. The present disclosure is not limited to an IPS mode LCD device.

Here, the LCD device actually has N×M pixels defined by intersection between N gate lines and M data lines. However, for the sake of brief description, one pixel composed of red, green and blue (R, B, B) sub-pixels is exemplarily illustrated.

For reference, reference numerals Ps and BS denote one sub-pixel region and a black stripe region, respectively.

Figure 5:
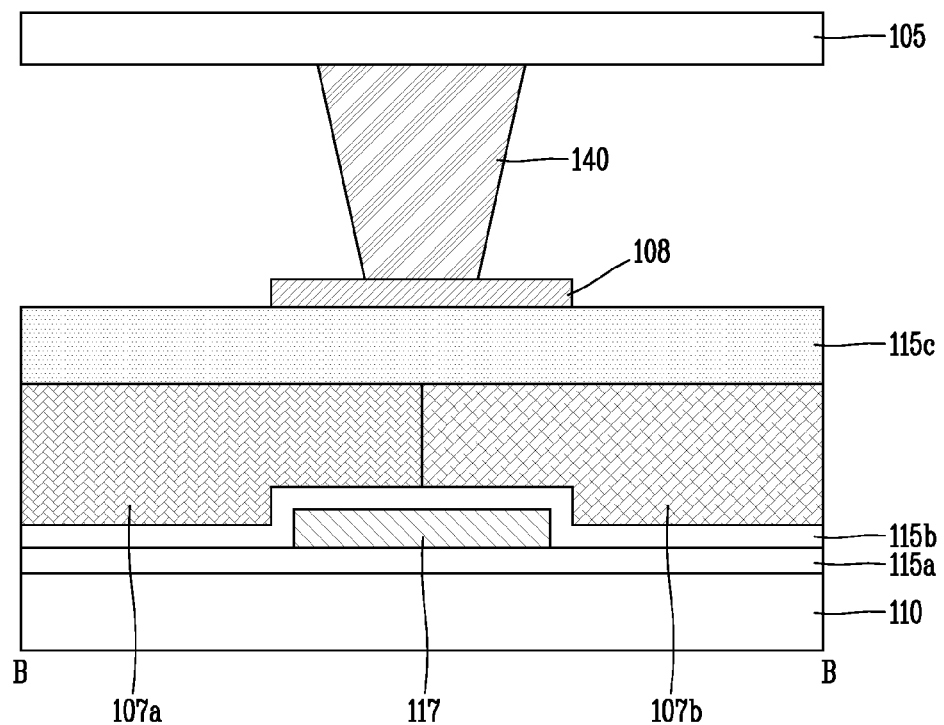
FIG. 5 is a schematic sectional view taken along the line B-B' of FIG. 4.

FIG. 5 is a schematic sectional view taken along the line B-B' of FIG. 4.

Figure 6:
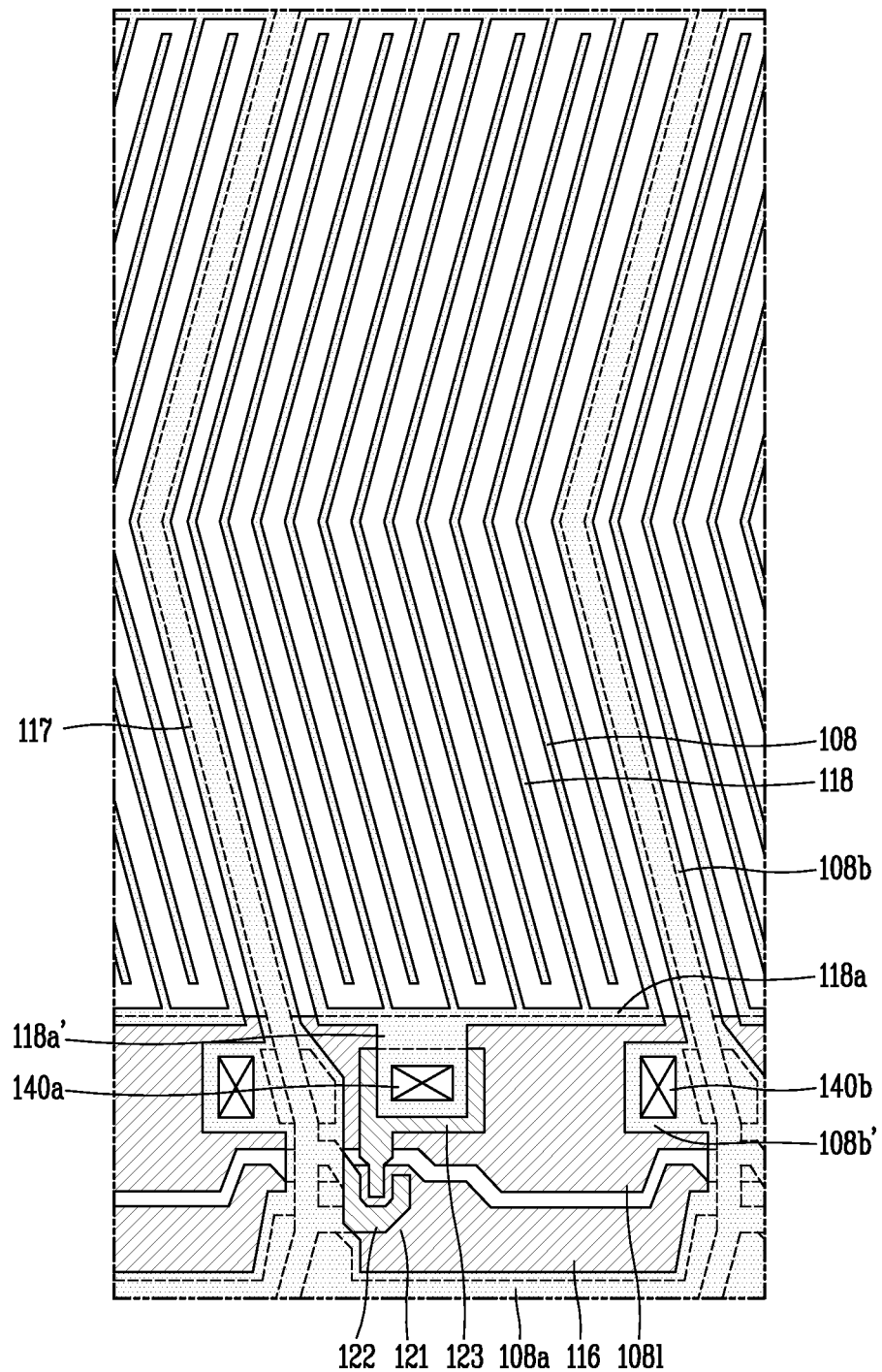
FIG. 6 is a planar view schematically illustrating a part of an array substrate of the LCD device illustrated in FIG. 4.

FIG. 6 is a planar view schematically illustrating a part of an array substrate of the LCD device illustrated in FIG. 4, which exemplarily illustrates a structure of the array substrate with respect to one sub-pixel.

Figure 7:
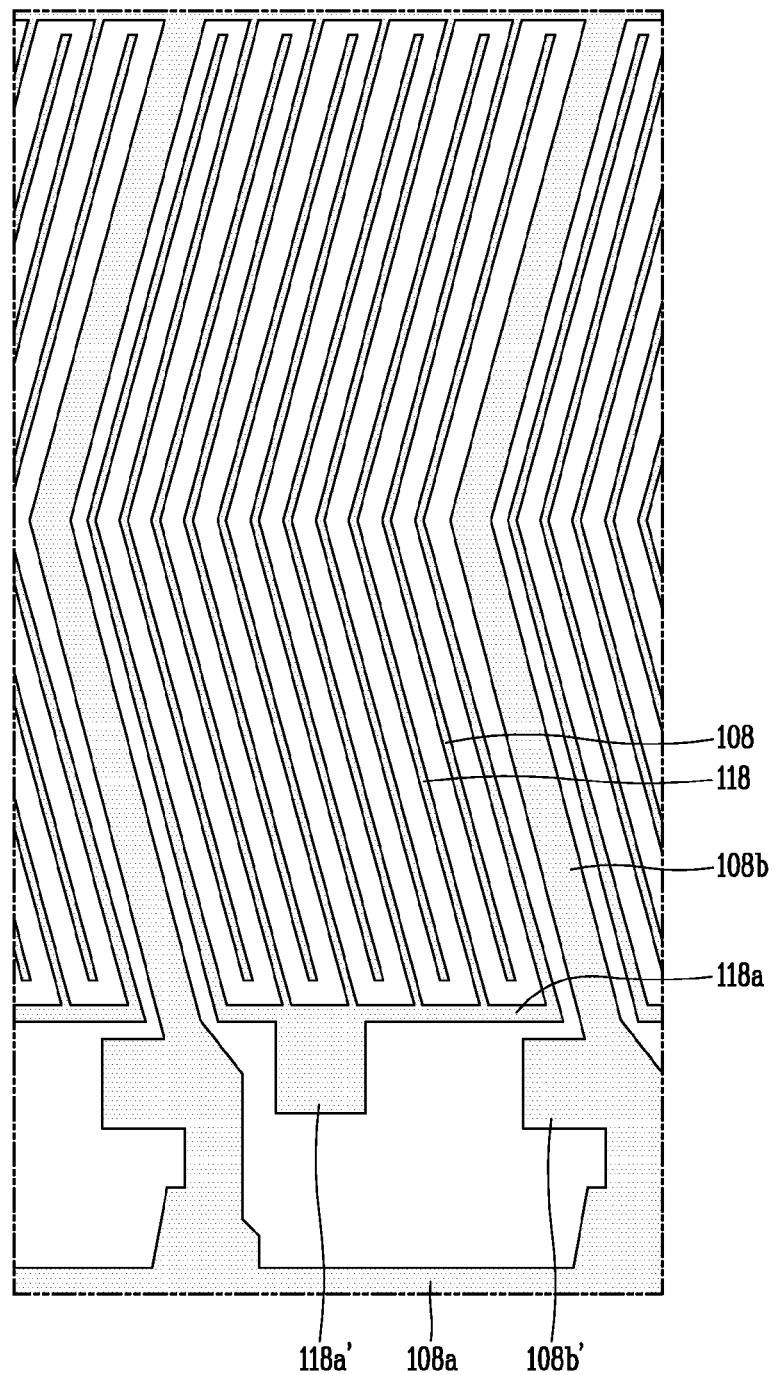
FIG. 7 is a planar view schematically illustrating a structure of a common electrode and a pixel electrode in the array substrate illustrated in FIG. 6.

FIG. 7 is a planar view schematically illustrating a structure of a common electrode and a pixel electrode in the array substrate illustrated in FIG. 6.

As illustrated in FIGS. 6 and 7, when the common electrode and the pixel electrode have a bending structure, liquid crystal molecules are arranged in two directions so as to form two domains (2-domain). This may result in further improvement of a viewing angle, compared with a mono-domain. However, the present disclosure is not limited to an IPS mode LCD device having the 2-domain structure. The present disclosure is also applicable to an IPS mode LCD device having a multi-domain structure having more than two domains. Also, the common electrode and the pixel electrode may not have the bending structure.

Referring to FIGS. 4 to 7, when the image panel is implemented as an LCD device, the image panel may include two sheets of glass substrates 105 and 110, and a liquid crystal layer (not shown) interposed therebetween with a cell gap maintained by a column spacer 140.

Here, the lower array substrate 110 according to the exemplary embodiment may have a color filter on TFT (COT) structure including a TFT and color filters 107a, 107b and 107c. The lower array substrate 110 may include light shielding patterns 108a, 118a and 108b formed on an up/down boundary between the sub-pixel regions Ps, namely, on the black stripe region BS, and on a left/right boundary between the sub-pixel regions Ps.

Here, gate lines 116 and data lines 117 defining the sub-pixel regions Ps may be arranged on the array substrate 110 in horizontal and vertical directions. That is, the gate line 116 may supply a scan signal from the gate driver (not shown) and the data line 117 may supply a video signal from a data driver (not shown). The gate lines 116 and the data lines 117 may intersect with a first insulating layer 115a interposed therebetween, thereby defining each sub-pixel region Ps.

A TFT as a switching device may be formed on each intersection between the gate lines 116 and the data lines 117. A plurality of common electrodes 108 and pixel electrodes 118, which generate a horizontal electric field to drive liquid crystal molecules, may be formed within each sub-pixel region Ps in an alternating manner.

The TFT may allow the video signal on the data line 117 to be charged and maintained in the pixel electrode 118 in response to the scan signal of the gate line 116. To this end, the TFT may include a gate electrode 121 connected to the gate line 116, a source electrode 122 connected to the data line 117, and a drain electrode 123 electrically connected to the pixel electrode 118. Also, the TFT may include a plurality of insulating layers 115a, 115b and 115c for insulation between components, and an active layer (not shown) forming a conductive channel between the source electrode 122 and the drain electrode 123 in response to a gate voltage supplied to the gate electrode 121.

Here, as aforementioned, according to the exemplary embodiment of the present disclosure, the common electrode 108, the pixel electrode 118 and the data line 117 may be formed in a bending structure so as to realize a multi-domain structure with a symmetric driving direction of liquid crystal modules. This may offset abnormal light, which is generated due to a birefringence characteristic of liquid crystal, so as to minimize color shift. That is, the color shift is caused according to a direction of viewing the liquid crystal molecules, due to the birefringence characteristic of the liquid crystal molecules. Especially, yellow shift is observed in a minor axis direction of the liquid crystal molecules and blue shift is observed in a major axis direction. Therefore, when the minor axis and the major axis of the liquid crystal molecules are appropriately arranged, a birefringence value may be compensated for so as to reduce the color shift.

The pixel electrode 118 may be made of an opaque conductive material, for example, molybdenum titanium (MoTi) having a low-resistive reflecting function. Each of the plurality of pixel electrodes 118 may have one end connected to a pixel electrode connection line 118a which is in parallel to the gate line 116. On the other hand, a part of the pixel electrode connection line 118a may extend to an upper side of the drain electrode 123 to form a first connection electrode 118a'. Here, the first connection electrode 118a' may be electrically connected to the drain electrode 123 of the TFT which is exposed through a first contact hole 140a.

The common electrode 108 may be made of the same material as the pixel electrode 118 on the same plane. The second light shielding pattern 108b, which is formed on the plurality of common electrodes 108 and the data line 117, may be connected to a common electrode connection line 108a which is in parallel to the gate line 116. A part of the second light shielding pattern 108b may extend to an upper side of a common line 1081 to form a second connection electrode 108b'. Here, the second connection electrode 108b' may be electrically connected to the common line 1081 which is exposed through a second contact hole 140b.

That is, in this exemplary embodiment, during an array process, the common line 1081 may be formed of molybdenum (Mo) or Mo alloy, which has low resistivity, to be in parallel to the gate line 116 using a mask for patterning the gate electrode 121 and the gate line 116. The common line 1081 may then be electrically connected to the common electrode 108 through the second contact hole 140b, thereby reducing a load of the common electrode 108. This may result in a reduction of crosstalk of an image.

Here, the second contact hole 140b may be formed on each sub-pixel (R, G, B), but the present disclosure may not be limited to this. A formation position and the number of the second contact hole 140b may be freely selective. As one example, the second contact hole 140b may be formed only on the green sub-pixel (G) over which the common line 1081 extends.

A reference voltage for driving liquid crystal, namely, a common voltage may be applied to the common electrode 108 through the common line 1081. Accordingly, a horizontal electric field may be formed between the pixel electrode 118 with a pixel voltage signal supplied thereto and the common electrode 108 with the common voltage supplied thereto. The liquid crystal molecules, which are horizontally arranged between the array substrate 110 and the upper substrate 105 by the horizontal electric field, may be rotated due to dielectric anisotropy. As transmittance of light through a pixel region changes according to the rotated degree of the liquid crystal molecules, an image may be represented.

In the meantime, in this exemplary embodiment of the present disclosure, the color filters 107a, 107b and 107c may be formed on the same array substrate 110 as the TFT so as to define a COT structure.

As one example, the color filters 107a, 107b and 107c may be configured in such a manner that the red color filter 107a, the green color filter 107b and the blue color filter 107c are sequentially repeated along a lengthwise direction of the gate line 116 and equally repeated along a lengthwise direction of the data line 117. The red color filter 107a, the green color filter 107b and the blue color filter 107c may form one unit pixel. One unit pixel may display a stereoscopic image of a predetermined color by use of colored light which is emitted through the red color filter 107a, the green color filter 107b and the blue color filter 107c.

The column spacer 140 may be formed to maintain a cell gap between the array substrate 110 and the upper substrate 105.

According to the polarized glasses type stereoscopic image display device having the configuration according to the exemplary embodiment, to overcome a problem of an up/down viewing angle, the light shielding patterns 108a, 118a and 108b may be formed on the black stripe region BS and on a left/right boundary between the sub-pixel regions Ps. Here, as one example, the light shielding patterns 108a, 118a and 108b may be formed of the same opaque conductive material as the common electrode 108 and the pixel electrode 118 when the common electrode 108 and the pixel electrode 118 are formed on the array substrate 110.

In this case, for a method of arranging left and right images differently on the line basis, L and R images adjacent to each other in up and down directions may be accurately isolated from each other by the light shielding patterns 108a, 118a and 108b. Accordingly, the L image may reach only a left eye and the R mage may reach only a right eye.

Here, the light shielding patterns 108a, 118a and 108b may include the first light shielding patterns 108a and 118a formed on the up/down boundary between the sub-pixel regions Ps, namely, on the black stripe region BS, and the second light shielding pattern 108b formed on the left/right boundary between the sub-pixel regions Ps. Those light shielding patterns 108a, 118a and 108b may serve as the conventional black matrix, accordingly, the black matrix can be removed from the upper substrate 105.

That is, the first light shielding patterns 108a and 118a may be formed on upper and lower sides of the black stripe region BS to be in parallel to the common line 1081 and the gate line 116. The first light shielding patterns 108a and 118a may be spaced apart from or connected to the light shielding patterns 108a and 118a of an adjacent sub-pixel (R, G, B).

The second light shielding pattern 108b may cover the data line 117 to prevent color interference between the adjacent sub-pixels (R, G, B).

Here, the first light shielding patterns 108a and 118a, as illustrated in FIG. 7, may be formed to be open to the full within the black stripe region BS and simultaneously a light shielding layer 120 may be formed by additionally depositing color pigments on the open first light shielding patterns 108a and 118a. Accordingly, an internal reflection due to the first light shielding patterns 108a and 118a may be reduced in the structure without the black matrix.

That is, in view of the characteristic of the COT structure with the black matrix removed, the light shielding patterns 108a, 118a and 108b may shield light and prevent light reflection, instead of the thick black matrix. Here, when the light shielding patterns 108a, 118a and 108b have a large area, a problem in visibility may be caused due to light being reflected into an active area by the light shielding patterns 108a, 118a and 108b. Accordingly, the light shielding patterns 108a, 118a and 108b may be formed of a material with low reflectivity, but in this case, they may have disadvantages in resistivity and adhesion with other layers.

Accordingly, the present disclosure, as aforementioned, may form the first light shielding patterns 108a and 118a to be as open as possible within the black stripe area BS and simultaneously form the light shielding layer 120 by additionally depositing the color pigments on the open first light shielding patterns 108a and 118a.

Here, the light shielding layer 120 may be formed by mixing and depositing color pigments forming the color filters 107a, 107b and 107c while the color filters 107a, 107b and 107c are formed on the array substrate 110, which may result in improvement of process efficiency. Hereinafter, it will be described in more detail by explaining a method of fabricating an LCD device.

FIGS. 8A to 8E are planar views sequentially illustrating a fabricating process of the LCD device illustrated in FIG. 4.

Here, the same/like reference numerals throughout the specification refer to the same components, and other components not shown will be understood by the structure of the LCD device illustrated in FIGS. 4 to 7.

Figure 8A:
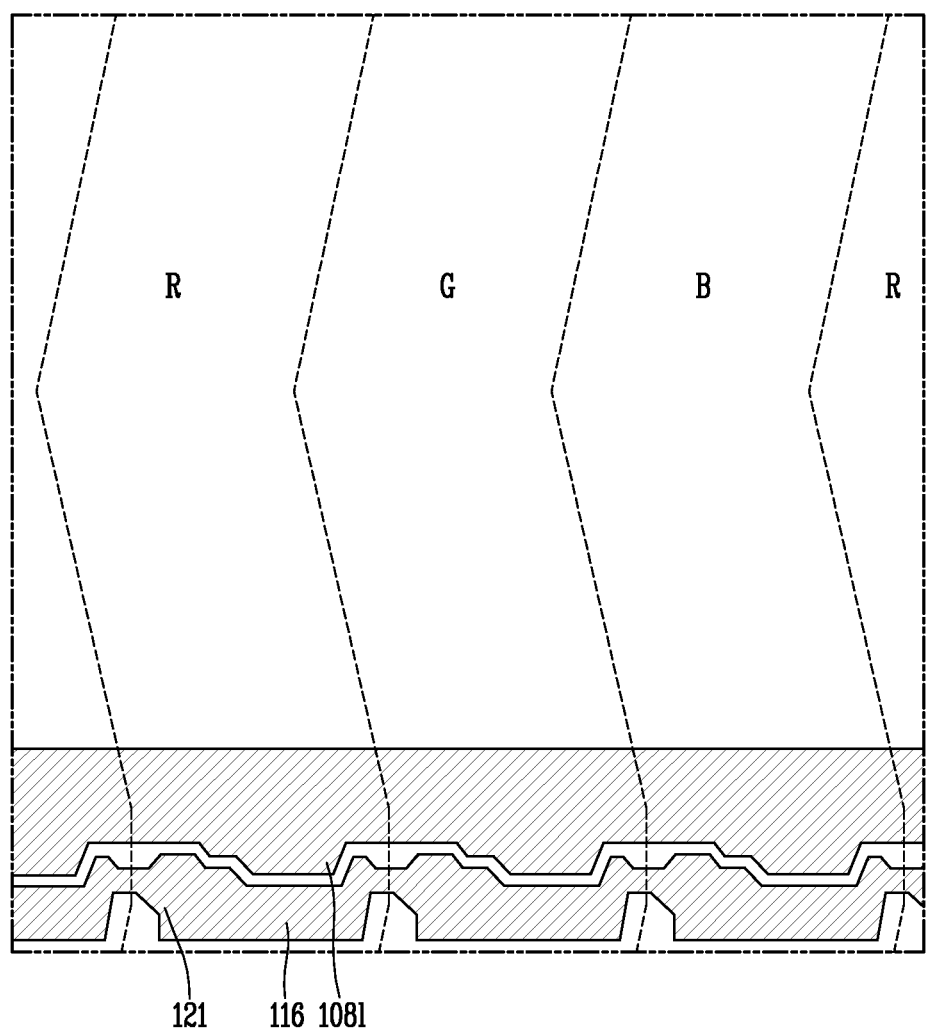
FIGS. 8A to 8E are planar views sequentially illustrating a fabricating process of the LCD device illustrated in FIG. 4.

Referring to FIG. 8A, a gate electrode 121, a gate line 116 and a common line 1081 may be formed on an array substrate 110 which is made of a transparent insulating material such as glass.

Here, the gate electrode 121, the gate line 116 and the common line 1081 may be formed by depositing a first conductive film on the entire surface of the array substrate and selectively patterning the first conductive film through photolithography.

Here, the first conductive film may be formed of an opaque conductive material with low resistivity, such as aluminum (Al), Al alloy, tungsten (W), copper (Cu), chromium (Cr), molybdenum (Mo), Mo alloy of molybdenum titanium (MoTi), and the like. The first conductive film may also be formed in a multi-layered structure that at least two types of the conductive materials with the low resistivity are deposited.

Here, the common line 1081 may be formed adjacent to an upper side or a lower side of the gate line 116, to be substantially in parallel to the gate line 116. However, the present disclosure is not necessarily limited to this exemplary implementation.

Figure 8B:
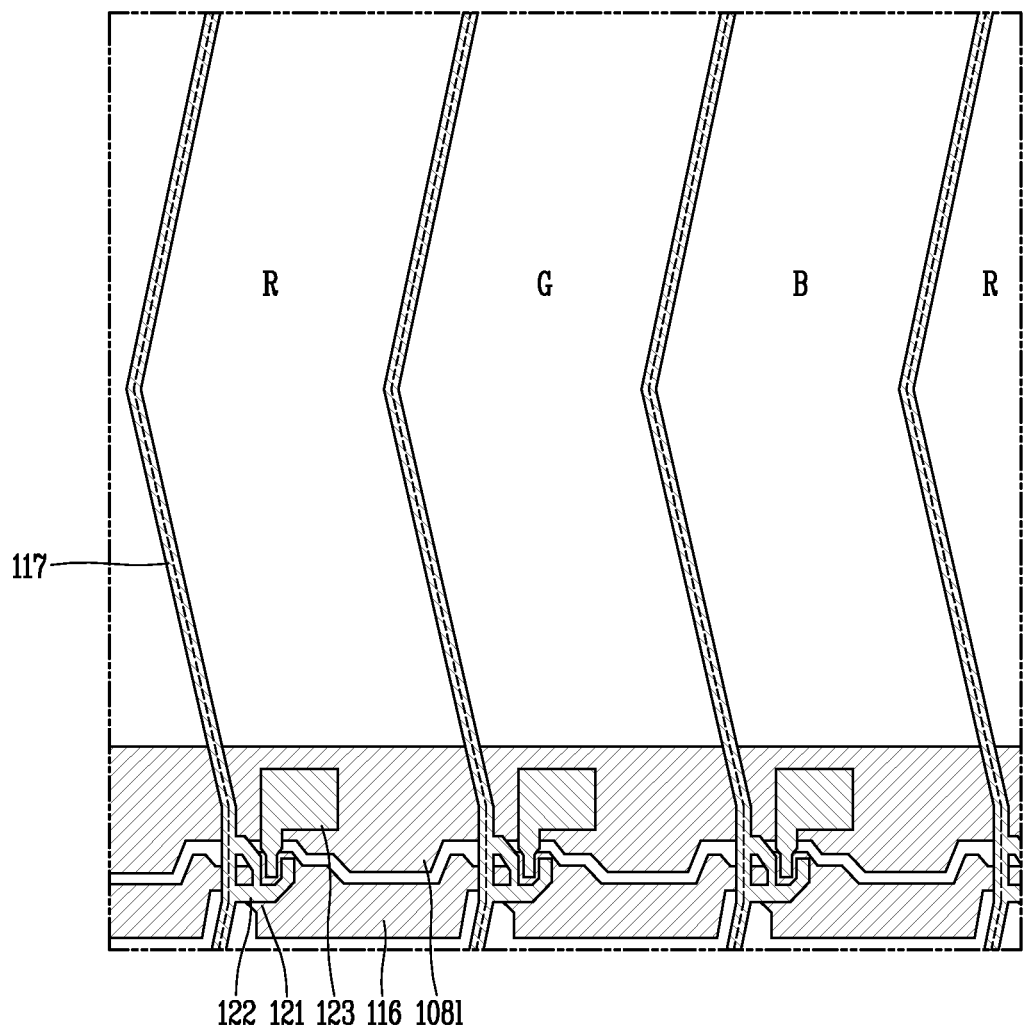

Referring to FIG. 8B, a first insulating layer 115a, an amorphous silicon thin film and an n+ amorphous silicon thin film may be formed on the entire surface of the array substrate 110 having the gate electrode 121, the gate line 116 and the common line 1081.

Afterwards, by selectively removing the amorphous silicon thin film and the n+ amorphous silicon thin film through photolithography, an active layer (not shown) which is formed of the amorphous silicon thin film may be formed on the gate electrode 121 of the array substrate 110.

Here, an n+ amorphous silicon thin film pattern (not shown), which is made of the n+ amorphous silicon thin film and patterned into substantially the same shape as the active layer, may be formed on the active layer.

Next, a second conductive film may be formed on the entire surface of the array substrate 110 having the active layer and the n+ amorphous silicon thin film pattern.

Here, the second conductive film may be formed of an opaque conductive material with low resistivity, such as aluminum (Al), Al alloy, tungsten (W), copper (Cu), chromium (Cr), molybdenum (Mo), Mo alloy of molybdenum titanium (MoTi), and the like, in order to form a source electrode, a drain electrode and a data line. The second conductive film may also be formed in a multi-layered structure that at least two types of the conductive materials with the low resistivity are deposited.

Afterwards, by selectively removing the n+ amorphous silicon thin film and the second conductive film through photolithography, a source electrode 122 and a drain electrode 123 made of the second conductive film may be formed on the active layer.

Also, data lines 117, which define sub-pixel regions Ps together with the gate lines 116, may be formed on the array substrate 110 through photolithography.

Here, an Ohmic-contact layer (not shown), which is made of the n+ amorphous silicon thin film and allows for Ohmic-contact between a source/drain region of the active layer and the source and drain electrodes 122 and 123, may be formed on the active layer.

The data line 117 may be formed into a bending structure together with a common electrode and a pixel electrode to be formed later. Here, the data line 117 may also have a multi-domain structure having a symmetric driving direction of liquid crystal molecules.

Here, the exemplary embodiment of the present disclosure illustrates that the active layer, the Ohmic-contact layer and the data line, namely, the source electrode 122, the drain electrode 123 and the data line 117 are individually formed through the two-time masking process, but the present disclosure may not be limited to this. The active layer, the Ohmic-contact layer and the data line may also be formed through a one-time masking process using a half-tone mask or a diffraction mask.

After the formation of the data line, a second insulating layer 115b may be formed on the entire surface of the array substrate 110.

Here, the second insulating layer 115b may be implemented as an inorganic insulating layer, such as silicon nitride (SiNx) or silicon oxide (SiO2), or as an organic insulating layer, such as photoacryl or the like.

Afterwards, by selectively removing the first and second insulating layers 115a and 115b through photolithography, a first contact hole 140a and a second contact hole 140b may be formed to partially expose the drain electrode 123 and the common line 1081.

Here, as aforementioned, the second contact hole 140b may be formed for each sub-pixel region (R, G, B), but the present disclosure may not be limited to this. The formation position and the number of the second contact hole 140b may be freely selective.

Figure 8C:
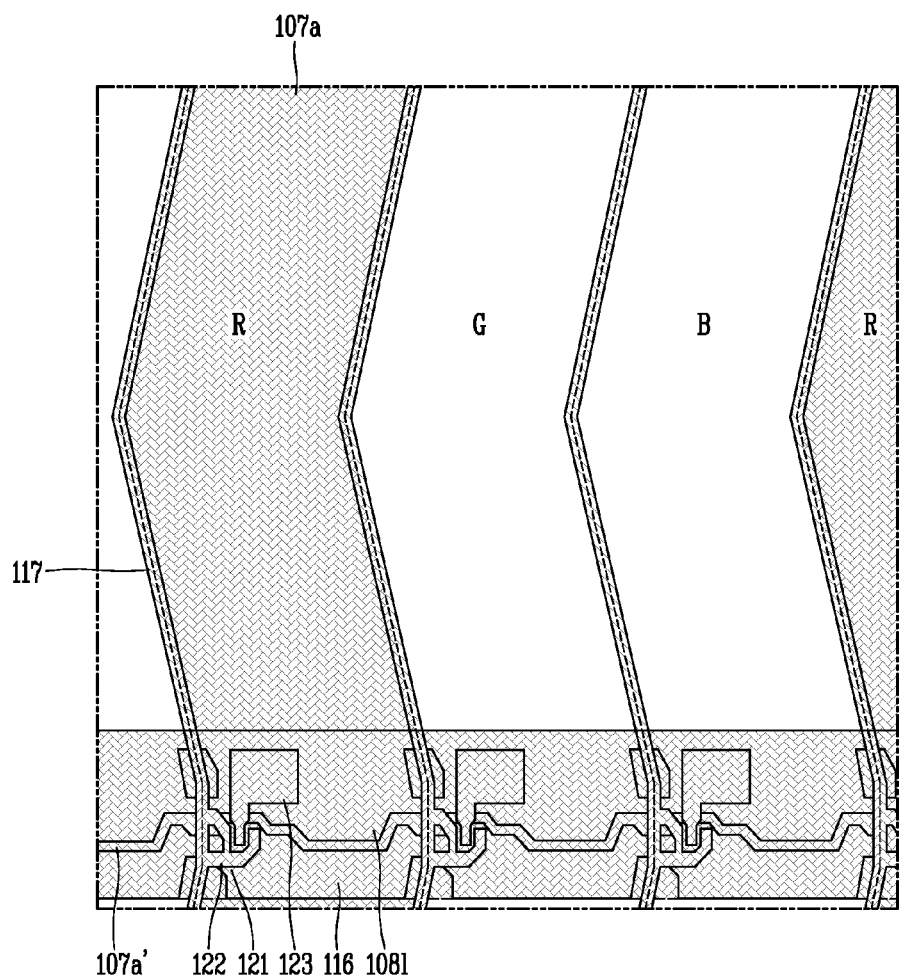
Figure 8D:
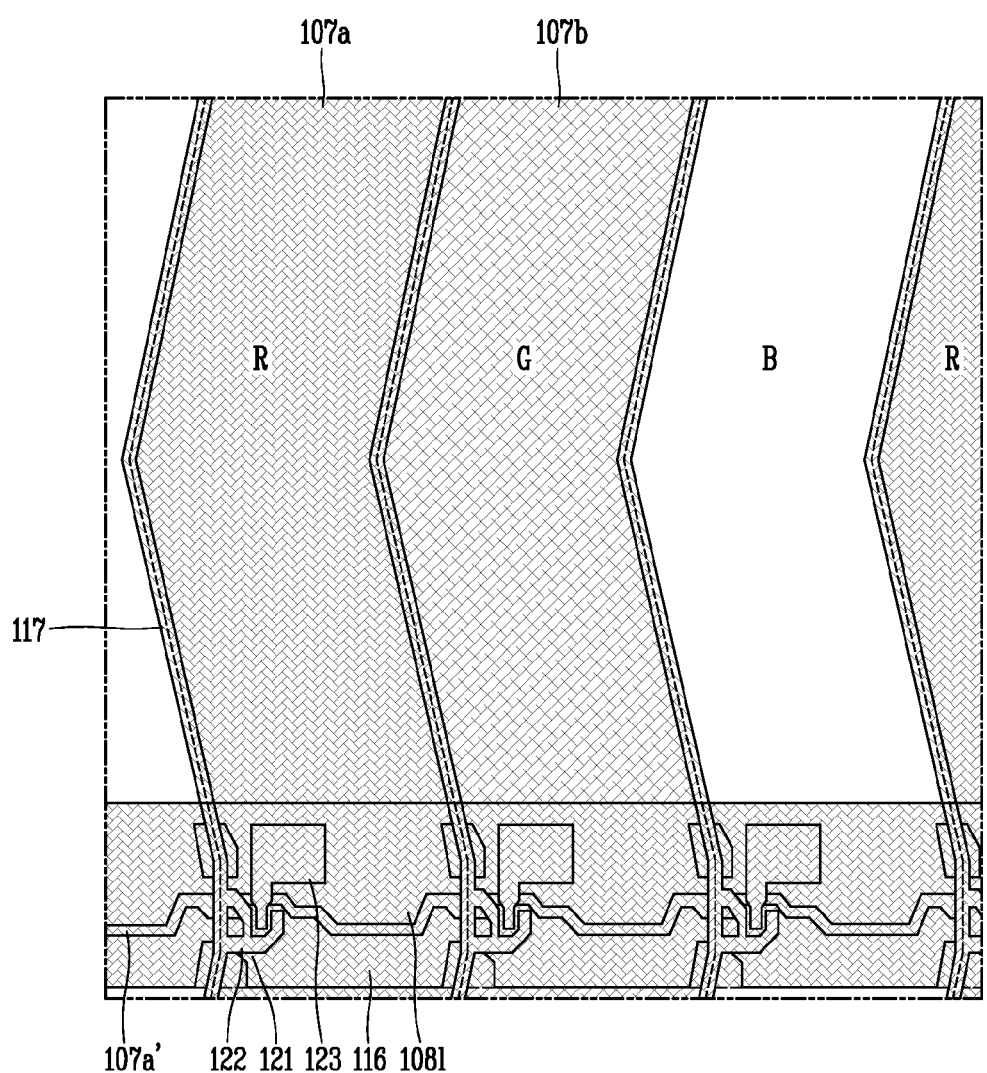

Referring to FIGS. 8C and 8D, red, green and blue color filters 107a, 107b and 107c may be formed within the sub-pixel region Ps of the array substrate 110 having the second insulating layer 115b.

Here, a light shielding layer 120 may be formed on the black stripe region Ps by mixing and depositing color pigments forming the color filters 107a, 107b and 107c.

As one example, referring to FIG. 8C, the red color pigment may be deposited on the entire surface of the array substrate 110 having the second insulating layer 115b, and then patterned through photolithography, thereby forming the red color filter 107a within the red sub-pixel (R). Here, a red color layer 107a' formed of the red color pigment may be formed within the black stripe region BS. As one example, the red color layer 107a' may be patterned to expose the first and second contact holes 140a and 140b.

Referring to FIG. 8D, a green color pigment may be deposited on the entire surface of the array substrate 110 having the red color filter 107a and the red color layer 107a', and then patterned through photolithography, thereby forming the green color filter 107b within the green sub-pixel (G).

Figure 8E:
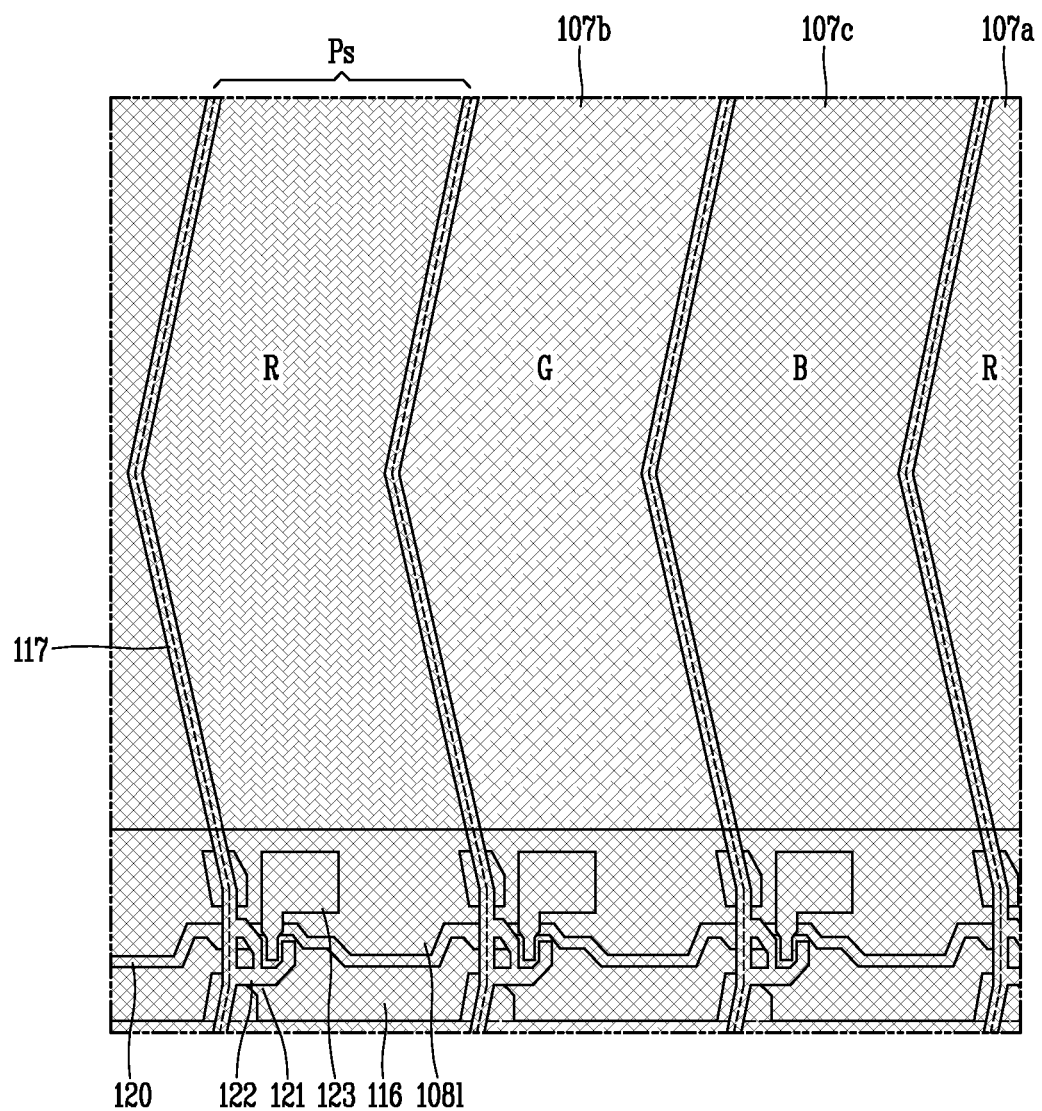

Referring to FIG. 8E, a blue color pigment may be deposited on the entire surface of the array substrate 110 having the green color filter 107b, and then patterned through photolithography, thereby forming the blue color filter 107c within the blue sub-pixel (B). Here, a blue color layer made of the blue color pigment may be formed within the black stripe region BS. As one example, the blue color layer may be patterned to expose the first and second contact holes 140a and 140b. The red color layer and the blue color layer deposited within the black stripe region BS may form the light shielding layer 120.

Next, a third conductive film may be deposited on the entire surface of the array substrate 110 having the color filters 107a, 107b and 107c. Here, a third insulating layer 115c may be formed prior to forming the third conductive film.

The third conductive film may be formed of an opaque conductive material with low resistivity, such as aluminum (Al), Al alloy, tungsten (W), copper (Cu), chromium (Cr), molybdenum (Mo), Mo alloy of molybdenum titanium (MoTi), and the like, in order to form a common electrode, a pixel electrode and light shielding patterns. The third conductive film may also be formed in a multi-layered structure that at least two types of the conductive materials with the low resistivity are deposited.

Afterwards, by selectively removing the third conductive film through photolithography, a plurality of common electrodes 108 and pixel electrodes 118 made of the third conductive film may be formed on the sub-pixel regions Ps.

Here, by selectively removing the third conductive film through photolithography, the first light shielding patterns 108a and 118a may be formed on upper and lower sides of the black stripe region BS to be in parallel to the common line 1081 and the gate line 116, and also form the second light shielding pattern 108b on a left/right boundary between the sub-pixel regions Ps to cover the data line 108b.

Here, the first light shielding patterns 108a and 118a may be formed to be as open as possible within the black stripe region BS to reduce an internal reflection due to the first light shielding patterns 108a and 118a.

The common electrode 108 and the pixel electrode 118 may be formed into the bending structure, as the same as the data line 117.

Afterwards, the array substrate 110 may be bonded to the upper substrate 105 in a facing manner by use of a sealant (not shown) formed along an outer edge of an image display region while a predetermined cell gap is maintained by the column spacer 140.

The exemplary embodiment of the present disclosure illustrates an amorphous silicon TFT using the amorphous silicon thin film as the active layer, but the present disclosure may not be limited to this. The present disclosure may also be applicable to a polycrystalline silicon TFT using a polycrystalline silicon thin film, an oxide TFT using an oxide semiconductor, and the like.

Also, the present disclosure may also be used for other display devices fabricated using the TFT, for example, an OLED display device having an OLED connected to a driving transistor, in addition to the LCD device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating a polarized glasses type stereoscopic image display device, representing a stereoscopic image by disposing a patterned retarder on a front surface of a liquid crystal display device, the method comprising:
    forming gate lines and data lines intersecting with each other on a first substrate to define red, green and blue sub-pixel regions;
    forming common lines in parallel to the gate lines;
    forming a thin film transistor on each intersection between the gate lines and the data lines;
    forming red, green and blue color filters within the red, green and blue sub-pixel regions of the first substrate;
    forming a light shielding layer on an up/down boundary between each of the sub-pixel regions, the light shielding layer being formed by depositing any color pigments of the red, green, and blue color filters;
    forming common electrodes and pixel electrodes within the sub-pixel regions of the first substrate;
    forming first portions of a first light shielding pattern that are either a part of the pixel electrodes or physically separate from the pixel electrodes, the first portions formed on upper edges of each of the up/down boundaries, the first portions formed in parallel to the gate lines and in a different layer than the gate lines and the common lines;
    forming second portions of the first light shielding pattern that are either a part of the common electrodes or physically separate from the common electrodes on lower edges of each of the up/down boundaries, the second portions formed in parallel to the gate lines and in a different layer than the gate lines and common lines, the second portions spaced apart from the first portions such that at least a part of the common lines or the gate lines are exposed in openings between the first portions and the second portions in the up/down boundaries;

bonding the first substrate to a second substrate.

2. The method of claim 1, wherein the first portions of the first light shielding patterns are formed of a same opaque conductive material on a same layer as the pixel electrodes, and the second portions of the first light shielding pattern are formed of a same opaque conductive material on a same layer as the common electrodes.

3. The method of claim 1, further comprising a common line adjacent to an upper side or a lower side of the gate line.

4. The method of claim 3, wherein the common line is formed on a same layer as the gate line to be in parallel to the gate line.

5. The method of claim 1, wherein the light shielding layer is formed in such a manner of depositing a red color pigment of the red color filter and a blue color pigment of the blue color filter.

6. The method of claim 1, further comprising forming a second light shielding pattern on a left/right boundary between the sub-pixel regions to cover the data line.

7. A polarized glasses type stereoscopic image display device, representing a stereoscopic image by disposing a patterned retarder on a front surface of a liquid crystal display device, the polarized glasses type stereoscopic image display device comprising:

gate lines and data lines on a first substrate and intersecting with each other to define red, green and blue sub-pixel regions;

common lines in parallel to the gate lines;

a thin film transistor on each intersection between the gate lines and the data lines;

red, green and blue color filters within the red, green and blue sub-pixel regions of the first substrate, respectively;

a light shielding layer on an up/down boundary between each of the sub-pixel regions, the light shielding layer comprised of any color pigments of the red, green and blue color filters;

common electrodes and pixel electrodes within the sub-pixel regions of the first substrate;

first portions of a first light shielding pattern that are either a part of the pixel electrodes or physically separate from the pixel electrodes, the first portions located on upper edges of each of the up/down boundaries, the first portions located in parallel to the gate lines and in a different layer than the gate lines and the common lines;

second portions of the first light shielding pattern that are either a part of the common electrodes or physically separate from the common electrodes on lower edges of each of the up/down boundaries, the second portions located in parallel to the gate lines and in a different layer than the gate lines and common lines, the second portions spaced apart from the first portions such that at least a part of the common lines or the gate lines are exposed in openings between the first portions and the second portions in the up/down boundaries;

a second substrate bonded to the first substrate in a facing manner.

8. The device of claim 7, wherein the first portions of the first light shielding patterns are comprised of a same opaque conductive material on a same layer as the pixel electrodes, and the second portions of the first light shielding pattern are comprised of a same opaque conductive material on a same layer as the common electrodes.

9. The device of claim 7, further comprising a common line adjacent to an upper side or a lower side of the gate line.

10. The device of claim 9, wherein the common line is located on a same layer as the gate line to be in parallel to the gate line.

11. The device of claim 7, wherein the light shielding layer is comprised of a red color pigment of the red color filter and a blue color pigment of the blue color filter.

12. The device of claim 7, further comprising a second light shielding pattern on a left/right boundary between the sub-pixel regions to cover the data line.

13. The method of claim 1, wherein the display device does not include a black matrix structure other than the first light shielding pattern and the light shielding layer.

* * * * *